Patented Apr. 28, 1942

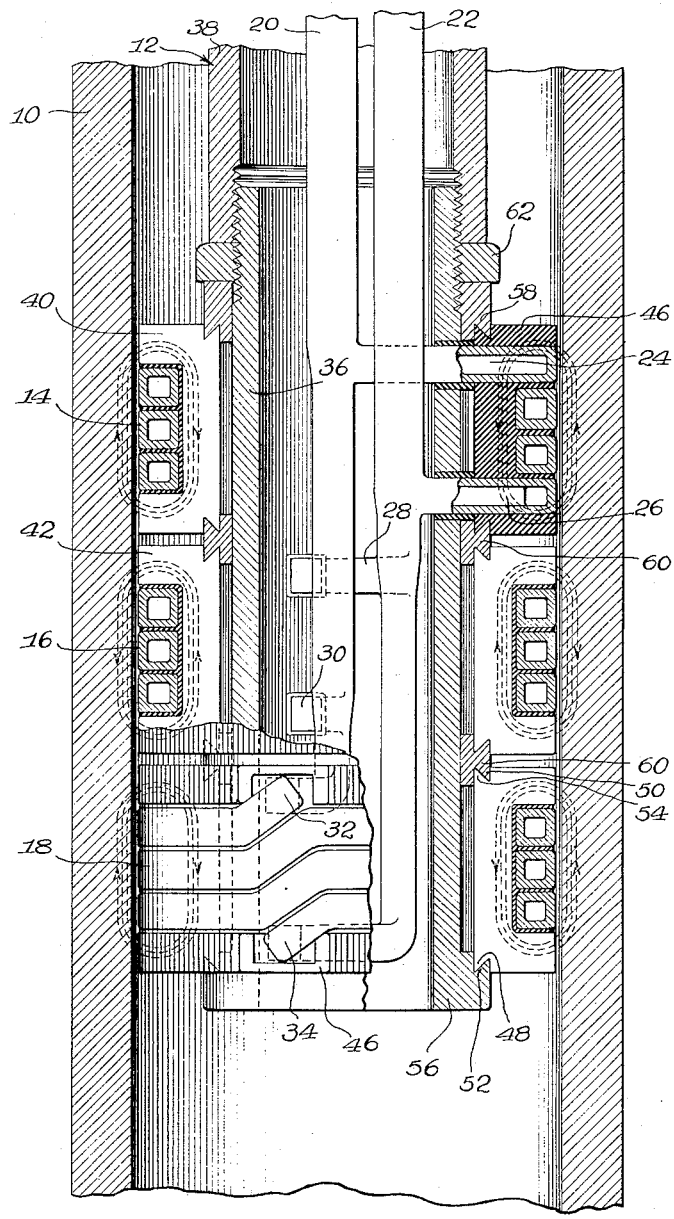

2,281,334

UNITED STATES PATENT OFFICE 2,281,334

HEAT TREATMENT

Howard E. Somes, Detroit, Mich., assignor to Budd Induction Heating, Inc., Philadelphia, Pa., a corporation of Michigan Application May 17, 1940, Serial No. 335,843

10 Claims. (Cl. 219—13)

The present invention relates to induction heating by high frequency alternating currents, and relates to apparatus especially adapted for differential heat treatment of metal objects such as tubes and the like.

In the differential heat treatment of metal objects such as tubes and the like and, for example, such as in the hardening of the internal walls of such tubular objects to a uniform controlled depth, difficulty is had in connection with extended heat treating coils in that the depth of differential heating may be difficult to control. For example, where an elongated coil is employed the flux in traversing through the work spreads itself more evenly through the portion of the work adjacent the central part of the coil and becomes more concentrated at the portions of the work adjacent the ends of the coil. Where an iron core is employed and the flux enters the work at one end and leaves at the other, such flux distributes itself throughout the length of the portion of the work adjacent the coil in such a manner as to cause a greater depth of heating adjacent the central portion of the coil and a lesser depth at the ends. The present invention is adapted to avoid this effect to a considerable degree by breaking the coil up into a number of small coils and connecting the coils so that the flux of each coil opposes the flux of each adjacent coil. Thus the lines of flux are restricted in length to that of each short coil and the distribution of flux from each individual coil does not penetrate into the work to such a depth as would be true were a long coil employed instead of the series of short coils, and likewise the depth of the heating currents is more closely controlled by reason of the use of a plurality of short coils as distinguished from an equivalent long coil. As shown in the drawing, the short coils are located closely adjacent the work.

It is accordingly an object of the present invention to provide an induction heating apparatus employing coils from which differential currents may be induced in a workpiece and in which the lengths of flux paths are maintained relatively short so that the depth of current penetration may be closely controlled.

Another object of the invention relates to the inducing of differential heating currents in a workpiece by high frequency induction in such a manner that the depth of current penetration is closely controlled through the breaking up of the flux path of the inducing coil into a plurality of adjacent opposed flux paths.

The above and other novel features of the invention will appear more fully hereinafter from the following detailed description when taken in conjuction with the accompanying drawing. It is expressly understood, however, that the drawing is employed for purposes of illustration only and is not designed as a definition of the limitation of the invention, reference being had for this purpose to the appended claims.

The single figure illustrates an apparatus constructed in accordance with the invention and adapted to attain the results described.

Referring to the drawing, there will appear a hollow tubular workpiece 10 and an induction heating head 12 located therein. The heating head is composed of a plurality of water cooled coils 14, 16 and 18, each of three turns each as illustrated and each connected to power leads 20 and 22 through connections 24, 26, 28, 30, 32 and 34.

The coils are mounted upon an arbor 36 carried by a suitable support member 38 with which the arbor is screw threadedly engaged. Preferably associated with each coil 14, 16 and 18 are cores 40, 42, each core of which is composed of an annulus of laminated magnetic material and an insulating lead block 46. Each core through dovetails 48 and 50 is secured to the arbor through interengaging dovetails 52 and 54, the latter being arranged on an end shoulder 56 of the arbor or upon an end ring 58 or upon spaced annular rings 60 located intermediate adjacent coils and their respective cores. The entire assembly is secured in tight engagement upon the arbor by the threaded ring 62 arranged on the arbor 36 so that the arbor and ring together with the coils form a demountable assembly readily removable from the member 38.

It will be observed that the leads 20 and 22 are so connected to the coils that the adjacent terminals of each adjacent pair of coils are at a like potential at all times. For example, the conductor 22 is connected to the adjacent terminals of the adjacent coils 14 and 16 through leads 26 and 28 whereas the coils 16 and 18 have their adjacent terminals connected to the conductor 20 through leads 30 and 32. Thus the fields generated by the adjacent coils at all times buck one another and discourage the presence of flux interlinkages embracing more than one coil. Any flux interlinkage embracing more than one coil is also discouraged by increasing the reluctance of any such flux path through the provision of an air space between each pair of complementary pole pieces and their core portions. With such extremely short flux interlinkages as result from short coils of the few turns disclosed, the depth of penetration of the skin currents induced within the workpiece 10 are more easily controlled and less likely to be subject to wide variations due to slight variations which might occur in the source of power or due to lack of homogeneity of the metal undergoing treatment.

Such an apparatus as is shown may be employed for differential heat treating of internal bores and the like and may be progressively moved through a bore in order to induce heating currents in the object to a desired depth. Through the use of a suitable quench to which the internally heated layer may be subjected immediately after passage of the heat treatment head thereover, differential hardening of the internal wall of the tube may be effected. Such a heat treat head, however, may be employed for various other purposes such as annealing to a prescribed depth of a hardened object and other uses where controlled differential heating is desired.

The uses to which the invention may be put are similar to those described in a copending application Serial No. 210,121, filed May 26, 1938, which has now eventuated into Patent No. 2,229,680, dated January 28, 1941, for Polyphase high frequency heating device, in which a similar arrangement is illustrated except that each coil is connected to a phase of a source of polyphase current. It will appear that in the use of the apparatus herein disclosed relative rotation between the work and the coil may be advantageous and in order that the coil end effects may be minimized, the terminals of the various coils are arranged at 120° angles from one another. With relative rotation extremely excellent control may be had over the depth to which the induced currents will flow, the control being considerably improved over that disclosed in the above-referred-to application because of the relatively short coil and because of the fact that the fields of adjacent coils buck one another at all times.

Though an embodiment of the invention has been illustrated and described, it is to be understood that the invention is not limited thereto but may be embodied in various modifications and arrangements which may be made without departing from the spirit of the invention as will be apparent to those skilled in the art. Accordingly, reference will be had to the appended claims for a definition of the limits of the invention.

What is claimed is:

1. Apparatus for heat treating a surface portion of an elongated workpiece comprising a plurality of high-frequency inducing coils and cores therefor having pairs of complementary pole pieces spaced apart in the direction of elongation of the workpiece, said coils having each of their convolutions and cores lying closely adjacent the workpiece and extending over a length less than the length of the workpiece and presented to the surface to be treated to guide the magnetic flux into the latter, the magnetic circuit of each coil being axially spaced from the magnetic circuit of each other coil insofar as the portions of said magnetic circuits outside the work are concerned, all adjacent pole pieces being of the same polarity and being spaced in the direction of elongation a fractional portion of the length of each of the coils or the pole pieces, and means for effecting relative movement between the said series of coils and the workpiece in the direction of elongation.

2. Apparatus for heat treating an elongated cylindrical surface portion of a workpiece internally by high-frequency electromagnetic induction to a depth extremely small relative to the diameter of the cylindrical surface comprising a plurality of internal inducing coils each having a pair of complementary pole pieces of opposite polarity extending radially into close proximity to the cylindrical surface to be treated, said pairs of pole pieces being spaced axially of the cylindrical surface with adjacent pole pieces of the same polarity and spaced axially a fractional portion of the axial extent of each of the coils, and means for effecting relative axial motion between the cylindrical surface and the coils.

3. Apparatus for heat treating a portion of a cylindrical surface of a workpiece by high-frequency electromagnetic induction comprising an inducing element having a series of annular pairs of pole pieces extending radially into close proximity to the surface to be treated and spaced axially along the cylindrical surface with pole pieces of like polarity adjacent each other and the complementary pole pieces of opposite polarity of each coil spaced axially a distance substantially less than one half the diameter and less than the axial extent of the portion of the surface to be treated, each pair of complementary pole pieces being magnetically independent of each other pair of such pole pieces, and means for effecting relative axial motion between the inducing element and the workpiece.

4. An apparatus for electromagnetic inductive heat treatment comprising a plurality of pairs of pole pieces, the pole pieces of each pair being magnetically connected and adapted to lie closely adjacent the work, each such pair embracing an inducing conductor, each of the adjacent pairs of pole pieces being arranged with like poles adjacent one another but spaced longitudinally less than the length of each pair, the magnetic circuit of each pair of pole pieces being magnetically separate and longitudinally spaced from the magnetic circuit of each other pair of pole pieces, each inducing conductor also being adapted to lie closely adjacent the work, the longitudinal extent of each pair of pole pieces being relatively small, and means for effecting a relative longitudinal movement between the work and said inducing conductors.

5. An apparatus for heating work by electromagnetic induction which comprises an inducing conductor, a core embracing said conductor and having pole pieces extending toward the work, another core and conductor longitudinally aligned with respect to the first core and conductor but spaced therefrom less than the longitudinal depth of one of the core pole pieces, whereby the magnetic circuit external to the work for each core is spaced and separate from that of an adjacent core, and means for effecting relatively longitudinal movement between the work and the cores.

6. An apparatus for heating work by electromagnetic induction which comprises an inducing coil, a core embracing said conductor and having pole pieces extending adjacent the work, another coil and core axially aligned with the first coil and core and of substantially the same diameter adjacent the work, said cores being axially separate and the adjacent pole pieces of the separate cores being of the same polarity, each coil with its pole pieces being located closely adjacent the work, and means for effecting relative axial movement between the work and said cores with their coils.

7. In an apparatus for heating a workpiece by electromagnetic induction having cores each of which is relatively short and has a pair of pole pieces, said cores being longitudinally disposed in substantial alignment, each pair of complementary pole pieces including at least one inducing conductor, each such conductor and its pole pieces being located closely adjacent the work to be heated, and a support common to said conductors, their core portions and pole pieces, said support having a relatively high reluctance path to any flux from the cores, the improvement for concentrating the heating more upon the surface of the work and less into the depth of the work, except for conduction, by reducing the longitudinal extent of any flux path in the work and reducing the tendency of any flux to travel through either the work or said core a greater longitudinal distance than the length of the core between one pair of complementary pole pieces, which comprises each pair of complementary pole pieces and their connecting core portions being longitudinally spaced from each adjacent such pair a distance large enough to increase substantially the reluctance for any flux tending to circulate through the cores for a greater distance than a pair of complementary pole pieces, said spacing distance being less than the longitudinal extent of such a pair of pole pieces.

8. In an apparatus for heating a workpiece by electromagnetic induction having cores each of which is relatively short and has a pair of pole pieces, said cores being longitudinally disposed in substantial alignment, each pair of complementary pole pieces including at least one inducing conductor, each such conductor and its pole pieces being located closely adjacent the work to be heated, and a support common to said conductors, their core portions and pole pieces, said support having a relatively high reluctance path to any flux from the cores, the improvement for concentrating the heating more upon the surface of the work and less into the depth of the work, except for conduction, by reducing the longitudinal extent of any flux path in the work and reducing the tendency of any flux to travel through either the work or said core a greater longitudinal distance than the length of the core between one pair of complementary pole pieces, which comprises each pair of complementary pole pieces and their connecting core portions being longitudinally spaced from each adjacent such pair a distance large enough to increase substantially the reluctance for any flux tending to circulate through the cores for a greater distance than a pair of complementary pole pieces, said spacing distance being less than the longitudinal extent of such a pair of pole pieces, and means for further increasing the reluctance for any flux tending to circulate through the core for a greater distance than a pair of complementary pole pieces which means includes the adjacent poles on each side of a spacing distance being of the same polarity.

9. In an apparatus for heating a workpiece by electromagnetic induction having cores each of which is relatively short and has a pair of pole pieces, said cores being longitudinally disposed in substantial alignment, each pair of complementary pole pieces including at least one inducing conductor, each such conductor and its pole pieces being located closely adjacent the work to be heated, and a support common to said conductors, their core portions and pole pieces, said support having a relatively high reluctance path to any flux from the cores, the improvement for concentrating the heating more upon the surface of the work and less into the depth of the work, except for conduction, by reducing the longitudinal extent of any flux path in the work and reducing the tendency of any flux to travel through either the work or said core a greater longitudinal distance than the length of the core between one pair of complementary pole pieces, which comprises each pair of complementary pole pieces and their connecting core portions being longitudinally spaced from each adjacent such pair a distance large enough to increase substantially the reluctance for any flux tending to circulate through the cores for a greater distance than a pair of complementary pole pieces, said spacing distance being less than the longitudinal extent of such a pair of pole pieces, and means for securing each core portion to said support, located in each of said spacing distances and extending into said core portions.

10. In an apparatus for heating a workpiece by electromagnetic induction having cores each of which is relatively short and has a pair of pole pieces, said cores being longitudinally disposed in substantial alignment, each pair of complementary pole pieces including at least one inducing conductor, each such conductor and its pole pieces being located closely adjacent the work to be heated, and a support common to said conductors, their core portions and pole pieces, said support having a relatively high reluctance path to any flux from the cores, the improvement for concentrating the heating more upon the surface of the work and less into the depth of the work, except for conduction, by reducing the longitudinal extent of any flux path in the work and reducing the tendency of any flux to travel through either the work or said core a greater longitudinal distance than the length of the core between one pair of complementary pole pieces, which comprises each pair of complementary pole pieces and their connecting core portions being longitudinally spaced from each adjacent such pair a distance large enough to increase substantially the reluctance for any flux tending to circulate through the cores for a greater distance than a pair of complementary pole pieces, said spacing distance being less than the longitudinal extent of such a pair of pole pieces, and means for securing each core portion to said support, located in each of said spacing distances and extending into said core portions, and clamping means for holding said core portions and securing means on said support.

HOWARD E. SOMES.